(12) United States Patent
Haase (10) Patent No.: US 7,966,311 B2
(45) Date of Patent: Jun. 21, 2011

(54) SYSTEMS AND METHODS FOR PROCESSING QUERIES

(76) Inventor: Kenneth Haase, Dorchester, MA (US)

( * ) Notice: Subject to any disclaimer, the term of this patent is extended or adjusted under 35 U.S.C. 154(b) by 769 days.

(21) Appl. No.: 10/463,555

(22) Filed: Jun. 17, 2003

(65) Prior Publication Data

US 2005/0044064 A1    Feb. 24, 2005

Related U.S. Application Data

(60) Provisional application No. 60/389,196, filed on Jun. 17, 2002.

(51) Int. Cl.
G06F 7/00 (2006.01)
G06F 17/30 (2006.01)
(52) U.S. Cl. ......................................................... 707/713
(58) Field of Classification Search .............. 707/1–206, 707/3, 713, 999.003
See application file for complete search history.

(56) References Cited

U.S. PATENT DOCUMENTS

| | | | | |
|---|---|---|---|---|
| 5,546,570 A * | 8/1996 | McPherson et al. | | 707/4 |
| 5,675,745 A | 10/1997 | Oku et al. | | 395/207 |
| 5,675,819 A | 10/1997 | Schuetze | | 395/760 |
| 5,701,461 A | 12/1997 | Dalal et al. | | 395/604 |
| 5,867,686 A | 2/1999 | Conner et al. | | 395/495 |
| 5,870,559 A | 2/1999 | Leshem et al. | | 395/200.54 |
| 5,933,822 A | 8/1999 | Braden-Harder et al. | | 707/5 |
| 5,963,940 A | 10/1999 | Liddy et al. | | 707/5 |
| 5,970,490 A * | 10/1999 | Morgenstern | | 707/10 |
| 6,055,547 A | 4/2000 | Cooper et al. | | 707/204 |
| 6,073,129 A * | 6/2000 | Levine et al. | | 707/4 |
| 6,076,051 A | 6/2000 | Messerly et al. | | 704/9 |
| 6,076,088 A | 6/2000 | Paik et al. | | 707/5 |
| 6,167,370 A | 12/2000 | Tsourikov et al. | | 704/9 |
| 6,263,335 B1 | 7/2001 | Paik et al. | | 707/5 |
| 6,272,501 B1 | 8/2001 | Baumann | | 707/104 |
| 6,298,342 B1 * | 10/2001 | Graefe et al. | | 707/4 |
| 6,341,281 B1 * | 1/2002 | MacNicol et al. | | 707/3 |
| 6,519,592 B1 * | 2/2003 | Getchius et al. | | 707/6 |
| 6,523,001 B1 | 2/2003 | Chase | | 704/10 |
| 6,542,889 B1 | 4/2003 | Aggarwal et al. | | 707/5 |
| 6,615,253 B1 | 9/2003 | Bowman-Amuah | | 709/219 |
| 6,675,159 B1 | 1/2004 | Lin et al. | | 707/3 |
| 6,826,557 B1 * | 11/2004 | Carter et al. | | 707/2 |
| 6,829,605 B2 | 12/2004 | Azzam | | 707/5 |
| 6,901,399 B1 | 5/2005 | Corston et al. | | 707/6 |
| 6,906,719 B2 | 6/2005 | Chadha et al. | | 345/473 |
| 6,931,395 B2 * | 8/2005 | Day et al. | | 707/3 |

(Continued)

OTHER PUBLICATIONS

Notification of Transmittal of the International Search Report or the Declaration, mailed Sep. 18, 2003.

(Continued)

*Primary Examiner* — Kimberly Lovel
(74) *Attorney, Agent, or Firm* — Mintz, Levin, Cohn, Ferris, Glovsky and Popeo, P.C.

(57) ABSTRACT

The present invention relates to systems and methods for processing queries. One embodiment of the invention provides a system for executing complex procedural queries across a plurality of databases. The system includes: a query processor capable of partial execution of procedural queries; a set of database adaptors capable of optimizing or and referring collections of queries to external databases; and a query cache component in communication with the query processor and the set of database adaptors. The query cache component stores the results of external database queries in a query cache and notes when a query has not been stored and records the same query.

20 Claims, 5 Drawing Sheets

U.S. PATENT DOCUMENTS

| | | | | |
|---|---|---|---|---|
| 7,027,974 | B1 | 4/2006 | Busch et al. | 704/4 |
| 7,085,711 | B2 | 8/2006 | Kadambe | 704/201 |
| 7,103,590 | B1 * | 9/2006 | Murthy et al. | 707/3 |
| 7,120,574 | B2 | 10/2006 | Troyanova et al. | 704/9 |
| 7,171,351 | B2 | 1/2007 | Zhou | 704/9 |
| 2003/0014393 | A1 * | 1/2003 | Kabra et al. | 707/3 |
| 2003/0065874 | A1 * | 4/2003 | Marron et al. | 711/100 |
| 2003/0212660 | A1 * | 11/2003 | Kerwin | 707/1 |
| 2004/0073549 | A1 * | 4/2004 | Turkel et al. | 707/5 |

OTHER PUBLICATIONS

Baeza-Yates, et al., "Modern Information Retrieval", published by Addison Wesley, 1999, pp. ix-xvi; 99-116 (Chapter 4); 191-228 (Chapter 8).

Brill, E., "Transformation-Based Error-Driven Learning and Natural Language Processing: A Case Study in Part of Speech Tagging", *Computational Linguistics*, 21(4):1-37 (1995).

Church, K.W., "On Memory Limitations in Natural Language Processing", published in MIT Laboratory of Computer Science Technical Report MIT/LCS/TR, 245:1-162 (1980).

Cutting et al., "A Practical Part-of-Speech Tagger", published in Proc. 3$^{rd}$ ANLP, Trento, Italy, pp. 133-140 (1992).

Grefenstette, G.T., "Automatic Thesaurus Discovery via Selective Natural Language Processing: A Corpus based Approach", University of Pittsburgh, pp. 1-331 (1993).

Haase, K., "Interlingual BRICO", *IBM Systems J.*, 39(3&4):589-596 (2000).

Turtle, et al., "Evaluation of an Inference Network-Based Retrieval Model", *ACM Transactions on Information Systems*, 9(3):187-222 (1991).

* cited by examiner

Fig. 1

(selector (get-descendants "Joe Smith") military-parents?)

Fig. 2

```
(define (get-descendants x)
 ;; CHOICE indicates that both options are explored
 (choice (get x children)
         (get-descendants (get x children))))
(define (military - parents) X)
 (test (get x 'parents) 'vitae "military service"))
```

SYSTEMS AND METHODS FOR PROCESSING QUERIES

CROSS REFERENCE TO RELATED APPLICATION

This document claims priority to, and the benefit of the filing date of, co-pending provisional application entitled "Efficient Processing of Programmatic Queries through Iterated Patent Evaluation," assigned Ser. No. 60/389,196, filed Jun. 17, 2002, and which is hereby incorporated by reference in its entirety.

BACKGROUND OF THE INVENTION

The present invention relates to the implementation of database-driven applications. One challenge with such applications is to coordinate the logic of applications with the structure and organization of external databases to which the applications refer. Patterns of query and access that make sense for a particular application may be inefficient when translated directly into searches and retrievals made against an external database. An opportunity for addressing this challenge lies in the fact that the database interface can hide the actual implementation of complex requests, reorganizing their implementation to better fit the structure of the database and the costs of access.

The standard approach to this reorganization is to require that queries be expressed in particular limited formal languages whose logical properties are well understood. Queries in this language can then be manipulated to create logically equivalent queries that are more efficient to apply against a particular external database. The most widespread of such approaches is to describe queries in terms of a relational algebra, a mathematical formalism with certain core operations and combination methods. A particular query represented in terms of relational algebra can then be rewritten in a way which is provably identical to the original query but which can be executed more efficiently against a given database or set of databases.

Much of the database management system industry has standardized on an external query format, SQL (Structured Query Language), which maps cleanly into relational algebra, allowing query rewrites to provide efficient access to external databases without forcing application writers to customize their queries or operations any further than necessary to express their data requirements as a series of SQL queries and operations. In addition, this level of abstraction allows database designers to optimize databases for different kinds of access patterns (allowing even more efficient rewrites) without the recoding or recompilation of applications.

In the past decade, new data models have emerged which are object-oriented or object-relational. These systems typically work by either translating the object or hybrid models into the same relational algebra used in conventional databases or by augmenting the relational algebra in particular ways. In general, these approaches use the same core method of rewriting queries to better fit the structure of the external database.

The rewriting approach has a number of deficits.
1. It requires that the query language be restricted enough to allow rewritten queries to be provably equivalent to the original query.
2. Effective rewriting tends to require articulating, in some detail, the structure of the database itself; this may be difficult if the database is (for example) a networked external service provided by a third party.
3. It is difficult for the rewriting process to include aspects of the practical semantics of the application and database, which could produce substantial performance improvements; such practical semantics are most commonly built into the program logic of the application and so are outside the normal scope of query rewriting.
4. Query rewriting is typically a static process (done when an application is compiled or a query is first executed) and does not reflect information gathered during the actual execution of a query.

These deficits are now described further.

In order to produce provably equivalent rewrites (1), it is necessary to restrict the query language to disallow expressions that cannot be rewritten to yield provably identical queries. For example, standard programmatic constructs such as iterations and conditionals do not translate cleanly into relational algebra and so SQL normally does not handle such constructs directly. Instead, most SQL implementations break complex queries into sub-queries connected by the programmatic logic of iterations and conditionals, but the general query cannot generally take advantage of optimizations among the sub-queries. For example, the following pseudo-code fragment illustrates the problem in a very simple form:

```
ages=query('SELECT id,ages FROM people WHERE course='CS3091'>
avg_age=sum(x)/size(x)
heights=query('SELECT id,height FROM people WHERE course='CS3091'>
avg_height=sum(y)/size(y)
grades=query('SELECT id,grade FROM people WHERE course='CS3091'>
if correlate(ages,grades) > correlate(heights,grades): return 'age';
else return 'height';
```

It would probably be most efficient to combine the three database calls in the fragment, but database interfaces would generally be unable to do such a combination because the calls are separated by program logic outside of the normal scope of query optimization.

In order to rewrite queries as efficiently as possible (2), it is important to know the search and storage characteristics of the external database being accessed. For example, a given complex query may express certain independent operations in a particular order, but the order itself may not be logically important. A rewrite may reorder the operations but the most efficient reordering will most likely depend on the implementation of the underlying database and indexing store. An indexing store stores various indices associated with a database. When a third party provides a database, as is increasingly the case with web services (for instance), these characteristics may not be available.

Knowledge of practical semantics can dramatically decrease search times (3) and these practical semantics are generally unavailable to query rewriting. For example, a search for the children of chairs under the age of 32 should be resolved very quickly against almost any database, based on the definition of practical semantics and common sense. However, the use of such practical knowledge in optimizing queries for standard database systems is generally difficult because it can involve complex patterns of conditionals and dependencies that do not map well into a uniform relational algebra. For example, an external database can store metadata about the domains and ranges of particular relationships. Using this metadata, a code fragment such as the following:

```
(define (smart-get frame rel)
   (if (test frame 'isa (get rel 'domain)) (get frame rel)
      (fail)))
(smart-get (find-objects 'isa chair 'age (lessthan 32)) 'children)
``` could use the metadata to optimize a query, but it would have to do so by patterns of conditionals, which may not map easily into a relational algebra. For example, given that the recorded domain of 'children' is 'people', if none of the "young chairs" are people (and it is unlikely that the young chairs are people) a query processing system should be able to resolve this query quickly relative to conventional database management systems using relational algebra to rewrite the query.

Finally, the static rewriting of queries rules out optimizations that are based on the particulars of a query or on information that emerges during the query's execution (4). For instance, a query on a disjunction of values (for instance, the integral years 1990, 1991, 1992, and 1993), that are not known at query run time, could sometimes be converted into a range (1990-1993) in the event that the structure and organization of the external database supports ranges, but this is not possible if the query rewriting happens entirely at compile time or initial query time, before the actual values are known.

SUMMARY OF THE INVENTION

The present invention relates to systems and methods for dynamically optimizing database queries expressed in a general purpose programming language and executing searches and retrievals against a variety of databases whose storage characteristics may be only partially available to the processor of the query. The use of a general purpose programming language is intended to address deficits (1), (3), and (4) described in the background section. The ability to query against databases with little or no knowledge of their structure addresses deficits (2) and (4) described in the background section. These two characteristics are linked in the general architecture of the invention.

In one embodiment, a system according to the invention includes:
  a. A query buffer for holding a particular query expression, including multiple components or sub-queries (which may themselves have sub-queries), for iterated partial execution by a query execution unit.
  b. An external memory for storing non-persistent program data and procedures that can be routinely accessed in the course of query execution.
  c. A query execution unit (QEU) in communication with the query buffer and the external memory; the QEU executes a query by executing its sub-queries and combining their results in such a way that the incomplete execution of one sub-query does not rule out the execution of other independent sub-queries.
  d. A device in communication with the QEU; the device signals and responds to soft failures, which may terminate one sub-query of a query while allowing independent sub-queries to proceed.
  e. A "query cache" in communication with the QEU. The query cache stores known query results for immediate retrieval without recourse to external databases; in one embodiment the query processing system routes all external database accesses through the query cache. The query cache returns known results if they are available or returns a "soft failure" if they are not, while noting the details of the query that was made (a soft failure is an indication that not enough information is directly available, i.e., in the query cache, to execute a query or sub-query) for subsequent execution by the database adaptors; interactions between the QEU and the query cache generally specifies basic operations and search or access parameters, whose character is typically determined by the database adaptor which eventually resolves the query.
  f. A set of external database adaptors in communication with the query cache. The database adaptors have provisions for optimizing a set of independent queries bundled together into a single package; these bundles of queries come from the query cache after each re-execution cycle.

In one embodiment, a query processor includes components (a) (b), (c), and (d).

The query processor receives queries written using a query language for expressing database and search operations through a recursive combination of primitive operations; in one embodiment this language is a subset of an existing general purpose programming language.

An alternative embodiment of the system also includes:
  g. A query rewriter for converting certain query language constructs into a form that can be correctly executed by the query execution unit (c); in one embodiment the query rewriter when included is part of the query processor.

The described invention may be implemented either in hardware, in software, or in a combination of hardware and software. Embodiments of the invention can use a general purpose programming language or can be integrated in an application programmed in such a language. The physical memory for the various components may be part of a common physical memory shared between the components, e.g., where the invention is implemented in software.

Another embodiment of the invention provides a method for repeatedly executing a query and its component sub-queries. A sub-query may be made up of other sub-queries, and each sub-query either returns a result or signals a soft failure. In this embodiment, all of the sub-queries of a query are typically executed even if one of the sub-queries signals a soft failure.

Queries and sub-queries are either external (accessing an external database) or internal (combining results of other components). An external component may depend on the results of other internal or external components. In one embodiment of the invention, query execution has two features:
  The query processing system delays the actual execution of external queries so that accesses to external databases can be bundled together and optimized for more efficient execution; most commonly, the query processing system delays execution until the top level query finishes its partial execution, in order to maximize the opportunities for optimization.
  The query processing system caches the results of external queries so that re-execution of the program will not redundantly re-execute external queries.

The notion of executing the same program over and over to improve efficiency may seem counterintuitive, but it particularly reflects the increasing disparity between modern processor and cache speeds and disk and network access and latency times. As a consequence, the cost of repeated re-execution is normally small compared to the advantages of being able to bundle and sort accesses to external databases. However, this tradeoff may be diminished if overall execution time is high compared to database access times. In such cases, some accesses may be performed while the partial execution is still ongoing.

BRIEF DESCRIPTION OF THE ILLUSTRATED EMBODIMENT

DETAILED DESCRIPTION OF THE INVENTION

Figure 1:
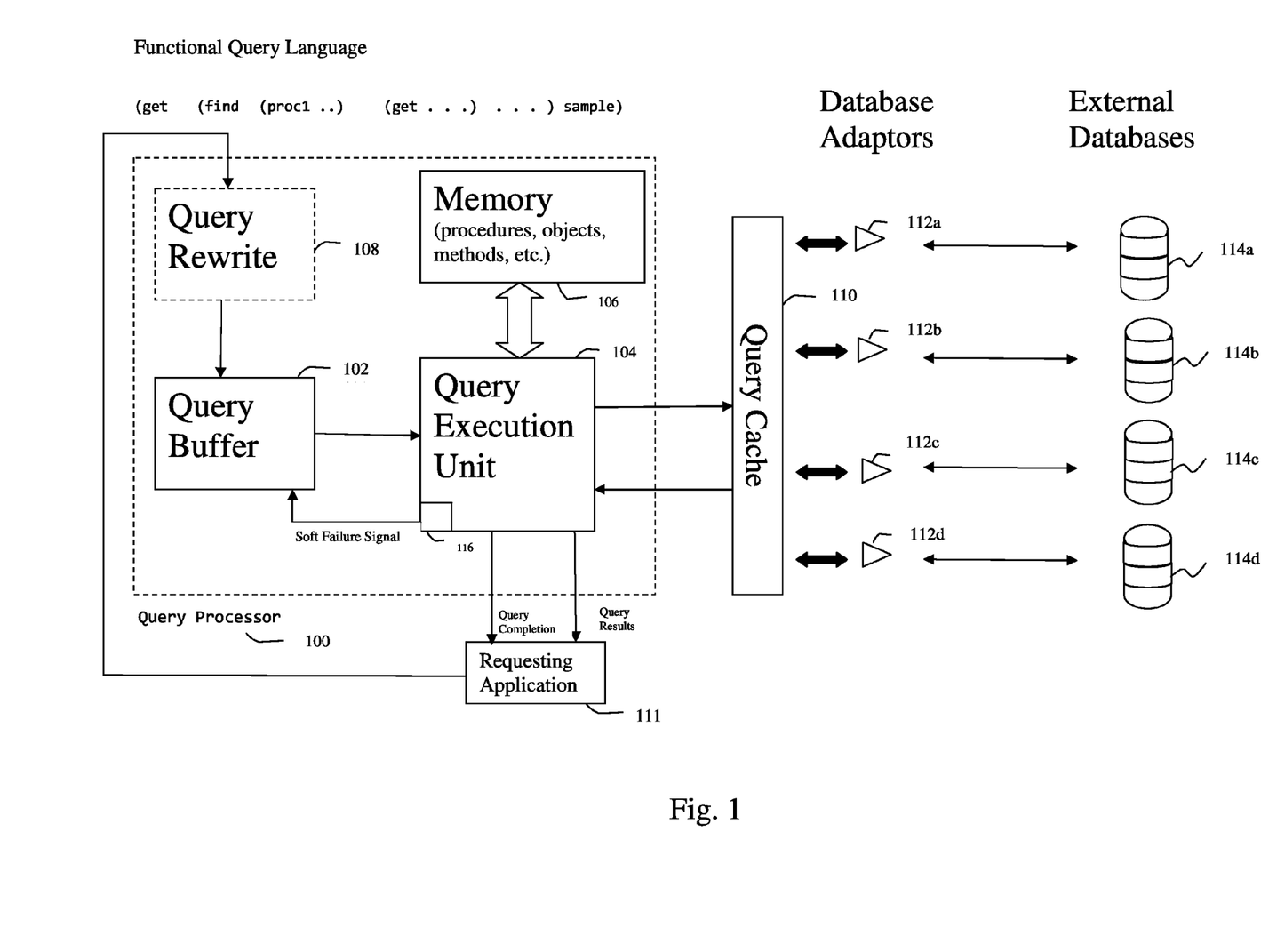
FIG. 1 is a schematic illustration of a system for processing queries according to one embodiment of the invention.

The invention relates to systems and methods for processing queries. In one embodiment, the invention provides a system for executing complex procedural queries across multiple databases. With reference to FIG. 1, the system includes: a query processor 100 capable of partial execution of procedural queries; a query cache 110 in communication with the query processor 100; and a set of database adaptors 112*a*-112*d* in communication with the query cache. The query cache stores the results of external database queries, notes when a query has not been stored, and records the same query. The database adaptors 112*a*-112*d* optimize or refer collections of queries to external databases 114*a*-114*d*, respectively.

One embodiment of the query processor 100 includes:
a. a query buffer 102 for holding a particular query expression, including multiple components or sub-queries (which may themselves have sub-queries), for iterated partial execution by a query execution unit;
b. an external memory 106 for storing non-persistent program data and procedures that can be routinely accessed in the course of query execution;
c. a query execution unit (QEU) 104 in communication with the query buffer 102 and the external memory 106; the QEU 104 executes a query by executing its components and combining their results in such a way that the incomplete execution of one sub-query does not rule out the execution of other independent sub-queries;
d. a device 116 in communication with the QEU 104. The device 116 signals and responds to soft failures, which may terminate one sub-query of a query while allowing independent sub-queries to proceed. In one embodiment if query execution completes without any soft failures, the device 116 signals a requesting application 111 that the query execution is complete. In addition, the QEU forwards the results of the execution to the requesting application 111; if query execution completes but a soft failure occurred, the device 116 signals the query buffer to retransmit the query to the QEU for execution.

The query processor 100 receives queries written using a query language for expressing database and search operations through a recursive combination of primitive operations; in one embodiment this language is a subset of an existing general-purpose programming language.

The query processor 100 optionally further includes a query rewriter 108 in communication with the query buffer 102. The query rewriter 108 can receive a query and convert certain query language constructs into a form that can be correctly executed by the QEU 116.

A more detailed description of elements of embodiments of the invention now follows. Note that one may implement elements described above in software or hardware or a combination of both.

The Query Language

In one embodiment, the query language is a subset of a general-purpose functional programming language such as Scheme. The use of a general-purpose language allows great versatility in the specification of database operations and combinations of database operations. The query language can make use of user defined compound procedures and methods, which abstract the execution of complex combinations of sub-queries into single points of entry. For example, a query can define an abstract procedure (such as 'get-descendants' described further below), which generates sub-queries of its own, allowing the construction of new "query operators." Allowing the construction of query operators simplifies the expression of complex queries. These user defined compound procedures and methods may be either explicit procedure calls or methods associated with an object-based programming model. In order for the invention to function correctly, a query in the query language should obey the following restrictions:

1. it is functional in that repeated executions, providing the underlying database has not changed, will yield the same result;
2. it is repetitively innocuous in that repeated executions can be safely done without sacrificing program or system integrity; for example, repeated execution of the procedure will not, of itself, allocate memory or disk resources without explicitly or implicitly releasing them.

In addition, a query is subject to the constraint that:

3. it is, as much as possible, severable so that the overall query can proceed in some manner even if parts of the query (sub-queries) fail.

These restrictions apply recursively to the query as a whole and its sub-parts, so that a query component or sub-query should also be functional, repetitively innocuous, and maximally severable. Note that restriction (2) applies only to the execution of the query itself and not to the operation of the invention as a whole, which typically will allocate new resources, especially in the query cache, over repeated iterations (and fully or partially release the resources after the final iteration).

A query that is externally side-effect free satisfies requirements (1) and (2). A query is externally side-effect free when the query does not alter variables, memory, or devices (real or virtual) outside of the procedure. Either rewriting the query (to, for instance, use local rather than global variables) or modifying the associated compiler or interpreter to invisibly insulate the executing procedure from external variables, memory, or devices satisfies requirements (1) and (2).

Figure 2:
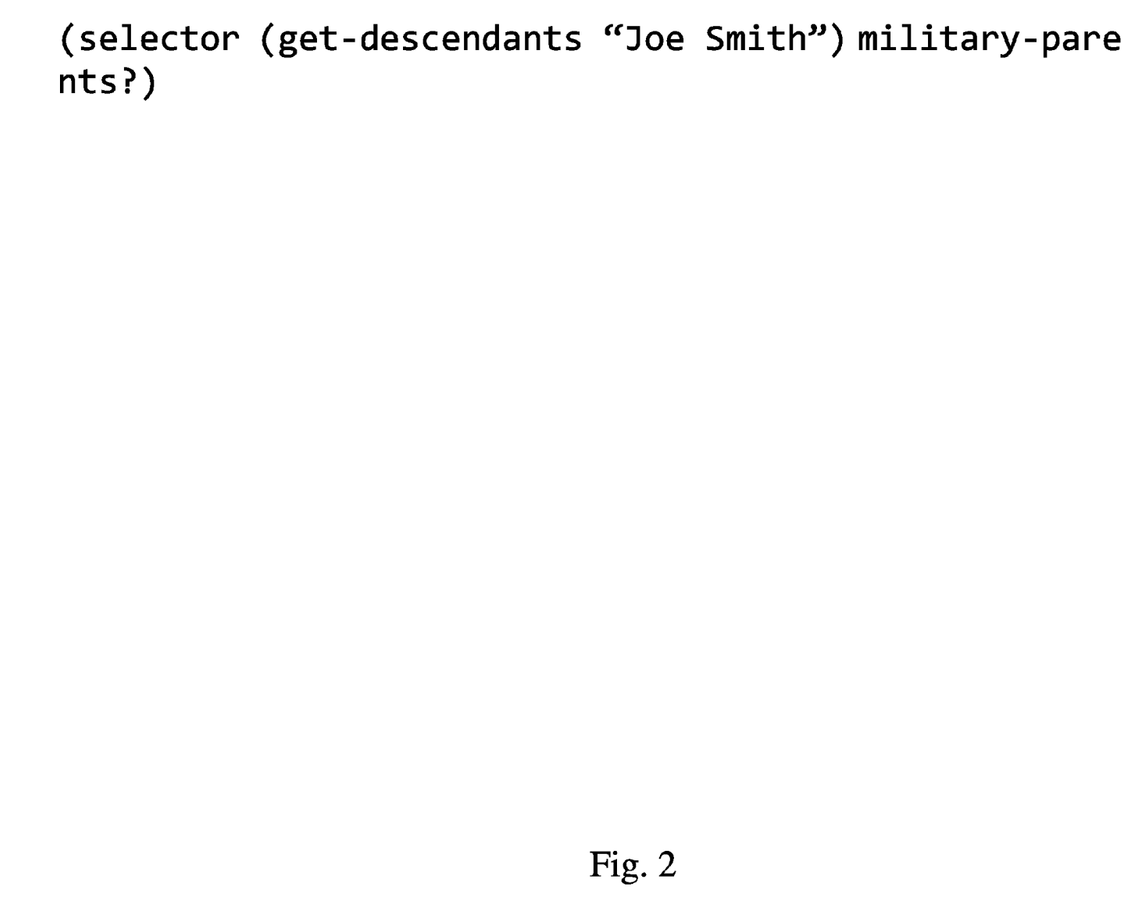
FIG. 2 is an example query using a query language based on Scheme.
Figure 3:
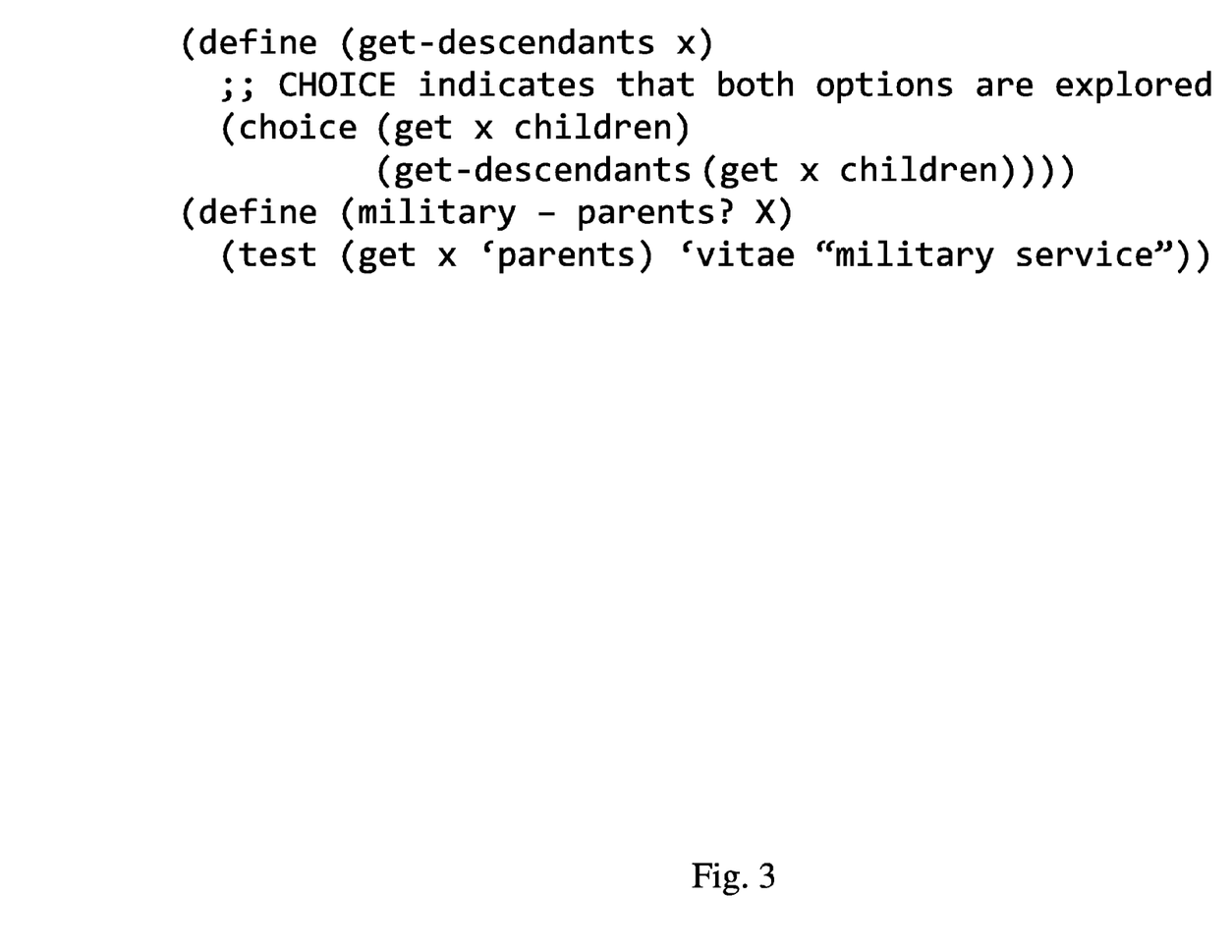
FIG. 3 is a procedure definition for the query shown in FIG. 2.

Most modern programming languages, for instance C, Java, or Ada contain subsets that are functional languages of the sort useful for this invention. These subsets can be used with this invention to optimize their access to external databases. For example, the relevant subset of the C programming language would exclude the assignment and increment/decrement operators as well as certain I/O operations An example query using a query language based on Scheme is listed in FIG. 2. The English form of the query would be "Find all the descendants of Joe Smith whose parents were in the military". As specified in FIG. 2, this query depends on the procedure definitions in FIG. 3. The code fragment shown in FIG. 3 begins by defining a procedure 'get descendants' which recursively gathers the identified children of an individual from the database. The code fragment also defines a procedure 'military-parents?', which gathers the parents of an individual when the parents have served in the military. One substantial advantage of using a general-purpose programming language for query expression is the ability to abstract complex query combinations into single procedures such as those listed in FIG. 3 and to use the full power of a functional programming language to construct such combinations.

This invention also applies readily to object oriented languages such as Java, Python, or Squeak, where a procedure is not uniquely specified by name (such as 'get-descendants') but is identified by the object and arguments of the procedure call. For example, the query ('get x children') may invoke different underlying procedures depending on the value of x. The chief requirement is that the procedure executed, whatever it is, should obey the above constraints and particularly that the overall query execution should obey restrictions (1) and (2) while (ideally) maximizing constraint (3).

In addition, some query programs that do not satisfy the above requirements can be automatically rewritten to satisfy them. This invention includes implementations that perform such automatic rewrites to meet the above restrictions.

Finally, the query processor may make special arrangements to ensure that the execution of a query satisfies the above restrictions, even if the query's normal interpretation would not. Some such arrangements are described below.

Query Processor

One embodiment of the query processor takes its input from the query buffer that maintains the top-level query during its execution. In one embodiment this buffer is stable and fast to access, since the query processor reads its contents again and again. As with the other components of this invention, the query buffer may be implemented in either hardware or software.

With reference to FIG. 1, one embodiment of the query processor includes a device 116 as noted above for indicating that a sub-query has signaled a soft failure. One can implement the device 116 in hardware or software or a combination of both. One embodiment of this device is a particular reserved "result value" that indicates the failure; another is the setting of a reserved variable or flag to indicate the event.

Figure 4:
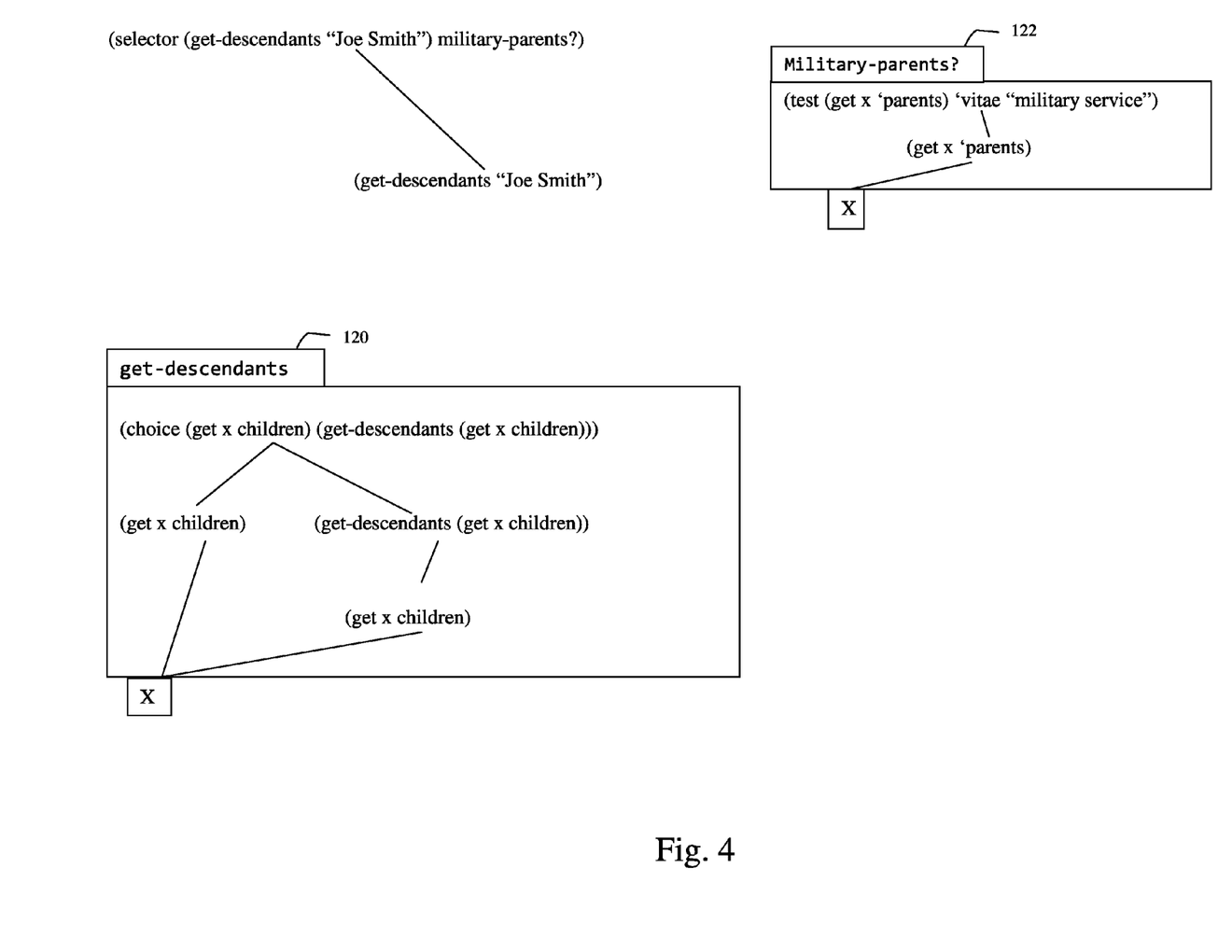
FIG. 4 illustrates the application of a test predicate to a result in the context of the example query of FIG. 2.

The general form of the query processor, as embodied in the query execution unit or engine, is a recursive descent evaluator that processes a query by first executing its sub-queries and then combining their results in a specific manner. FIG. 4 shows the breakdown into dependent sub-queries of the query of FIG. 2 and the supporting definitions of FIG. 3. To process a given query or sub-query, the query execution engine processes its dependent sub-queries and then executes a primitive action particular to the query. For example, in FIG. 4, the primitive action 'selector' takes the results of its first input (a sub-query, i.e., get descendents 120) and applies a test predicate (its second input, i.e., having parents with military service written in short hand as military-parents 122) to each result, returning those that satisfy the predicate. The code fragment shown in FIG. 3 defines the first input, get descendents. Similarly, the code fragment shown in FIG. 3 also defines the test predicate, military-parents. Get descendents 120 itself includes sub-queries, e.g., 'get x children' and 'get-descendents (get x children)'. Thus, the query processor processes dependent sub-queries such as 'get x children' and then executes a primitive action such as 'selector.' The query execution engine routinely refers to data and programs stored in the external memory.

The query execution engine may execute sub-queries in any order and even in parallel; the query restrictions (1) and (2) above ensure that such variant execution orders yield the same results.

One embodiment of the specific form of the query execution engine includes the following two characteristics:

A. in order to maximize severability, the query execution processes all the sub-queries of a sub-query (or the top level query) even if one of those sub-queries does not return normally;

B. in order to ensure that queries are repetitively innocuous (condition (2) above), query execution may insulate some external interactions involved in the execution.

The implementation of (A) relies directly on the device (d) for signaling soft failures, so that the soft failure of a sub query does not terminate the overall processing of the query.

The implementation of (B) potentially relaxes requirement (2) above. For example, one special case of restriction (2) is that the query does not modify the external databases that it is accessing. This restriction can be relaxed by providing for rollback of modifications made during query execution. One way to implement this rollback is by introducing local tables of modifications to each external database; when a modification is made, it is not actually written to the external database but stored in these local tables. When queries are made subsequently during the processing of the query, the contents of these local tables are then merged with whatever results come from the database directly. These local tables are then purged between iterative re-executions of the query procedure, causing the "virtual database" (the real database plus modifications stored in the tables) to be reverted to its original form. When the query finally runs to completion, the database changes stored in the local tables are actually written to the external database.

As described above, one embodiment of the query execution unit or engine uses a custom interpreter to execute the query in accordance with restrictions (1) and (2) and to maximize constraint (3). Embodiments of the invention include implementations where the optional query rewriter converts query language into program codes (possibly into some other language or even the native language of a hardware processor) that satisfy the same constraints. In this case, the query rewriter is acting as a conventional compiler to implement the semantics defined by criteria (1), (2), and (3) above.

One additional concern with regard to the query processor is the ease with which general-purpose programming languages can express non-terminating programs. One addition to the query processor includes provisions for resource limitation so that one embodiment of a query processing system may terminate a query when the query executes for too long or uses up excessive system resources. Standard engineering practice includes various software and hardware measures for implementing such restrictions.

Database Adaptors

A database adaptor takes a collection of independent database queries, produced by the partial execution of a complex procedural query, and executes these with respect to an external database. A database adaptor may reorder or reorganize the independent queries or it may simply bundle them into a single query for the external database. The null case of a database adaptor simply issues the independent database queries in sequence, but this is unlikely to result in any significant performance improvement. The database adaptor also updates the query cache with the results from the external database; this ensures that, on the next re-execution of the query, the particular query will not fail and the overall query will move towards completion.

Figure 5:
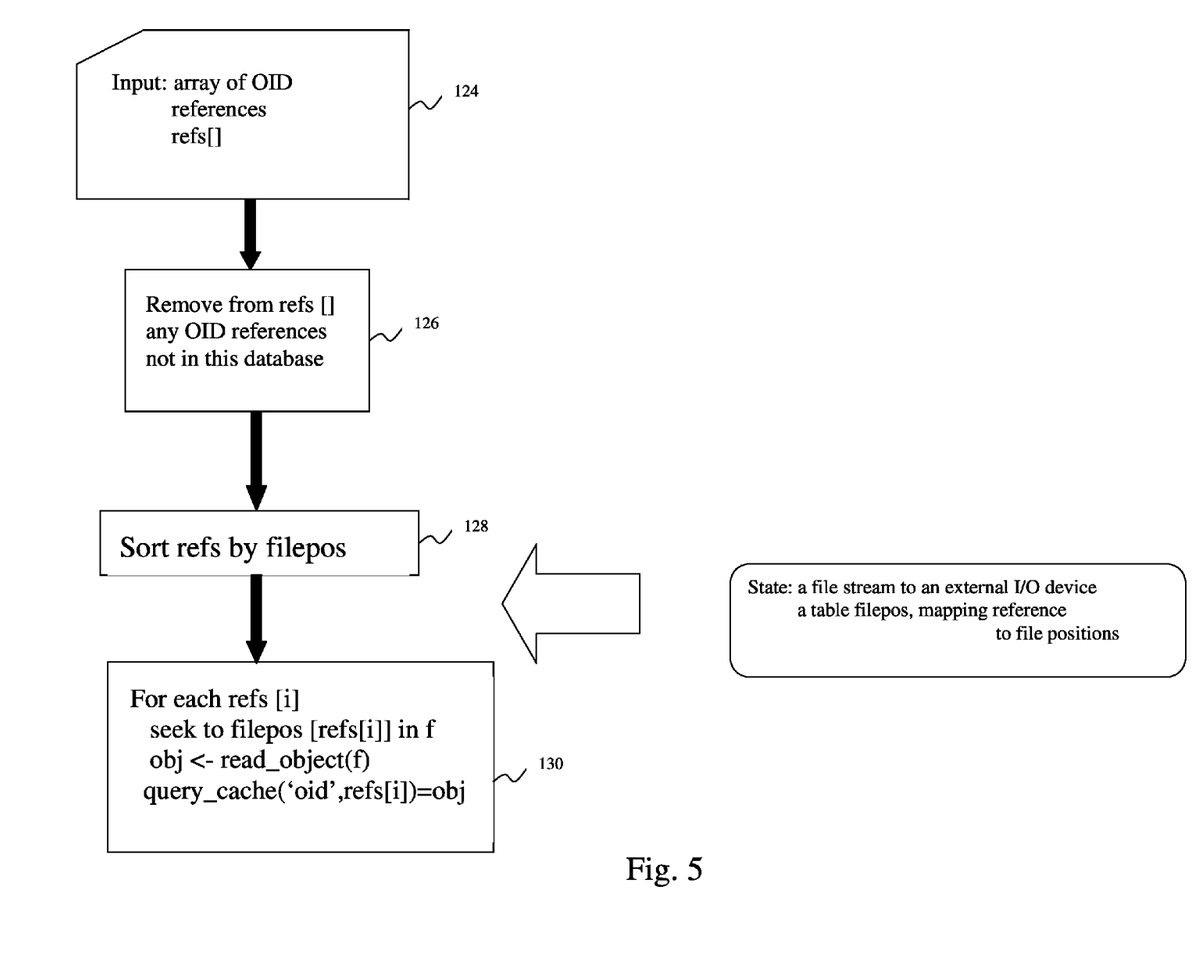
FIG. 5 illustrates a flow chart of one embodiment of the database adaptor of FIG. 1.

FIG. 5 describes the flow chart for one embodiment of a database adapter shown in FIG. 1. Its inputs 124 include a set of numeric object identifier (OID) references for which the adaptor retrieves associated values from a disk file and an associated table of file positions. The adapter first removes 126 any references that are out of the bounds of the database. It then sorts 128 the references by file position. Finally, it iterates 130 over all of the references to read their values from the disk file and store them in the query cache.

As another example, an adaptor for a network based database might divide the queries among several different remote servers based on different characteristics of each remote provider. Some optimization might also be further deferred to the network based service and whole Boolean queries, for instance, might be passed to these providers for them to process optimally. For example, a search that identifies records or objects with a conjunction of properties (e.g., individuals younger than 35 who have had 3 marriages) might be passed directly to a remote database server, which can choose an optimal way to execute the query.

This last example indicates that part of the implementation of the database adaptor may in some cases reside in the database itself. For example, if one database adaptor referred to a conventional SQL database, the adaptor could combine multiple queries into a single complex query, which the SQL database could optimize as a whole.

The foremost advantage of the database adaptor is the consolidation of multiple queries into single transactions, reflecting the latencies typically involved in access to external services whether networked or device-based. Secondary advantages derive from optimizations within a collection of queries (e.g., redundancy, where one basic query is made repeatedly within the complex query, or interaction, where a set of separate simple queries about an item can be combined into a single composite query about the item).

The Query Cache

One embodiment of a query processing system according to the invention uses the query cache to accumulate database responses across multiple iterations of a procedural query. One embodiment of the query cache is a lookup table. The lookup table: maps a query into a response; can indicate when a response has not been cached; and can store a query in a list of queries to be executed. The query cache may do some simple regularization of queries so that identical queries with different surface forms may only require one entry in the cache. For example, such regularization might co-identify searches for doctors in a particular zip code with a search for residents of a particular zip code who are doctors. This regularization is a simple version of the static query optimizations performed by the query rewriting approach (described previously), which is employed in most modern databases. The query cache can be implemented by several caches associated with each individual database but can also be implemented independently (and local to the query processor).

When an independent cache is available, it can also be used to separately cache expensive intermediate combinations of query results, allowing iterative re-executions to proceed more efficiently through avoidance of repeated calculations. For instance, one intermediate result could be the intersection of the results of two sub-queries; this intersection includes those members that are in both result sets. By caching the results of such an operation, the combination need only be executed once (when its sub-queries successfully complete) over all the re-executions of the top level query.

The actual implementation of the query cache may vary greatly depending on the physical processing substrate. It is preferred to have accesses to the query cache proceed as quickly as possible and thus, ideally, the query cache should be able to fit in the processor's on-die cache or at least on the main board of the system. In any event, the query cache should be resident in the system's primary memory.

In order to maintain a query cache with a small physical memory footprint (so that it can fit into the on-die cache), one embodiment uses a two-level cache where the query cache itself stores strings or object pointers as small integers which refer (in turn) to an external table where the small integers map to the actual strings or object addresses.

Persistent Query Caches

There can be substantial value to maintaining the query cache between individual query executions, given that some provision is made for keeping the cache up to date with the actual external database. This means that compound queries may execute much more quickly by taking advantage of sub-queries executed by previous queries.

The persistent cache can be kept up to date by a variety of methods. For instance, if the database adaptor is accessing a disk file as a database, it can note when the disk file has been modified and invalidate (or check for consistency) the corresponding elements of the persistent query cache.

In certain embodiments, the persistent cache might also be limited to a fixed capacity. In such an embodiment, new values stored in the cache would potentially replace existing values, based on criteria such as which cached values were most recently accessed, which are most commonly accessed, or which took the most time to retrieve originally.

Implementation on Parallel Processors

When embodiments of the invention are implemented on parallel processors or in parallel threads of execution on a single processor, there is a challenge with parallel queries and/or with coordinating separate execute/retrieve cycles running in separate execution threads. A simple solution to this challenge is to lock the external databases during the database access operations that occur after every partial execution cycle. This is how database accesses would normally be handled in any multi-threaded environment, ensuring that independent threads do not contend for the same databases at the same time. Note that using this simple approach with the described invention improves performance over normal query execution (where every database access is performed without delay), because of the optimizations possible in bundling accesses together and avoiding multiple transactions and lock/unlock operations.

However, further advantage can sometimes be gained by waiting for a certain period for any query executions in process in separate threads. If these terminate within a particular period, their data requests can be merged together before being handed to the database adaptors and then either stored in a shared query cache or (more likely) separated out into per-thread query caches to avoid the overhead of lock/unlock cycles for each cache access.

When there are thread-local query caches and a global persistent cache, the global persistent cache can be consulted before actually going to the external database.

An Example

Suppose one has a genealogical database to which one wishes to apply certain queries. The genealogical database contains objects describing individuals and their relationships to other individuals. The database also contains other information about those same individuals. For instance, it might describe dates of birth and death, employment, military service, residence, travels, etc.

Suppose one wants to execute a query whose English form might be:

Find all the descendants of "Joe Smith" whose parents were in the military whose transcription into computer code might look like this:

```
(define (get-descendants x)
   (choice (get x children) ; This indicates that both options are explored
        (get-descendants (get x children))))
(filter-choices (candidate (get-descendants "Joe Smith"))
   (exists 'event "military service" 'subject (get candidate 'parent)))
```

This code fragment begins by defining a procedure 'get-descendants' which recursively gathers the identified children of an individual from the database. This procedure is then used by the 'filter-choices' expression, which gets all the descendant's of "Joe Smith" and returns only those entries for which their exists a "military service" event including the parent of the descendant. This sort of complicated pointer-following procedure is impossible to express in a simple query to a standard relational database, but is especially common for knowledge based operations.

If the database were large, this query would execute each request for an object or relation independently, taking substantial computation time and looking up any underlying resources (for instance disk files) in which the data were stored.

Using one embodiment of a system and method according to the present invention, the query would start by processing both

```
(get "Joe Smith" children)
(get-descendants (get "Joe Smith" children))
``` both of which would fail because they require database access (to lookup the descendants); as a consequence the entire query would fail, but it would be known that the operation (get "Joe Smith" children) would need to be performed. It is performed and then cached. At this point the execution is done again:

```
[x]   (get "Joe Smith" children)
[ ]   (get-descendants (get "Joe Smith" children))
[ ]      (get "Joe Smith Jr." children)
[ ]      (get "Mary Jones" children)
[ ]      (get "George Smith" children)
[ ]      (get-descendants (get "Joe Smith Jr." children))
[ ]      (get-descendants (get "Mary Jones" children))
[ ]      (get-descendants (get "George Smith" children))
``` where the first operation succeeds but subsequent operations fail. However, it is now known that execution of:

```
(get "Joe Smith Jr." children)
(get "Mary Jones" children)
(get "George Smith" children)
``` is necessary. This is done and the individual queries for the children of Mary, George, and Joe Jr. can be scheduled optimally. Once their results have been cached, the system proceeds:

```
[x]   (get "Joe Smith" children)
[ ]   (get-descendants (get "Joe Smith" children))
[x]      (get "Joe Smith Jr." children)
[x]      (get "Mary Jones" children)
[x]      (get "George Smith" children)
[ ]      (get-descendants (get "Joe Smith Jr." children))
[ ]         (get "Joe Smith III." children)
[ ]         (get-descendants (get "Joe Smith Jr." children))
[ ]      (get-descendants (get "Mary Jones" children))
[ ]         (get "Sally Jones" children)
[ ]         (get "Tom Jones" children)
[ ]         (get "John Jones" children)
[ ]         (get-descendants (get "Mary Jones" children))
[ ]      (get-descendants (get "George Smith" children))
         ;;George Smith had no children, so is not expanded.
```

Again, many of the later calls fail, but the system knows that it needs to retrieve:

```
[ ]   (get "Joe Smith III." children)
[ ]   (get "Sally Jones" children)
[ ]   (get "Tom Jones" children)
[ ]   (get "John Jones" children)
``` and which, again, it can schedule optimally. Once this is done, one has the following set of queries and cached values:

```
[x]   (get "Joe Smith" children)
[ ]   (get-descendants (get "Joe Smith" children))
[x]      (get "Joe Smith Jr." children)
[x]      (get "Mary Jones" children)
[x]      (get "George Smith" children)
[ ]      (get-descendants (get "Joe Smith Jr." children))
[x]         (get "Joe Smith III." children)
[ ]         (get-descendants (get "Joe Smith Jr." children))
[ ]      (get-descendants (get "Mary Jones" children))
[x]         (get "Sally Jones" children)
[x]         (get "Tom Jones" children)
[x]         (get "John Jones" children)
[ ]         (get-descendants (get "Sally Jones" children))
[ ]         (get-descendants (get "Tom Jones" children))
[ ]         (get-descendants (get "John Jones" children))
[x]      (get-descendants (get "George Smith" children))
            ;; George Smith had no children
```

For brevity, one can assume that none of this latter generation has had children yet, so one is able to fill out the whole set of requests and get the response.

This part of the execution made eight requests to the database (calls to 'get') but grouped them into four transactions. In the next phase, the filter operation executes the test condition (exists 'event "military service"' subject (get candidate 'parent))

for each of the seven values above. Partial execution of each test fails when the "parent" field is being fetched (at least in some embodiments), but the seven requests are all bundled together at the end. Then, the entire expression is executed again and the calls to "exist" can be completely executed. This results in five database calls altogether, which can be executed together and stored in the query cache. At this point, the query expression is executed one final time, returning the individuals matching the request.

In this example, twenty-four retrievals were done in all but the use of the method caused these to be clustered into six groups. This clustering can cause performance improvements when either there are substantial setup costs for each block of requests or when the ordering of requests can affect performance (as when access to external physical media such as disks are involved).

Having thus described at least one illustrative embodiment of the invention, various alterations, modifications and improvements are contemplated by the invention including the following: aggressive caching of intermediate values (as well as database accesses) to make the iterated partial executions more efficient; maintenance of performance data across different database adaptors in order to select among alternatives which refer to different databases; and the number of database adaptors used by the invention may be more or less than the four illustrated in FIG. 1 (for example, in one embodiment the query processing system may use only two database adaptors). Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A system for executing complex procedural queries across a plurality of databases, the system comprising one or more processors configured to function as:
   a query processor configured to iteratively execute a complex procedural query defined using a general-purpose functional programming language, the complex procedural query comprising a top-level complex procedural query and sub-queries;
   a set of database adaptors configured to optimize and refer collections of queries, corresponding to the complex procedural query, to external databases; and
   a query cache in communication with the query processor and the set of database adaptors, the query cache configured to store results of the external database queries in the query cache and note unresolved data which the complex procedural query needs but does not have;
   wherein the query processor is configured to detect a soft failure,
   wherein the query processor is configured to execute a subsequent iteration of the entire complex procedural query, if unresolved data is noted from a previous iteration of the complex procedural query, using the stored results,
   wherein the complex procedural query is severable such that at least a first portion of the complex procedural query can proceed even if a second portion of the complex procedural query fails.

2. The system of claim 1 wherein results in the query cache persist between queries.

3. The system of claim 2 wherein the query cache is configured to provide a two-level cache, where a query-specific query cache refers to a global persistent query cache.

4. The system of claim 1 wherein the query processor comprises:
   a query buffer for maintaining the top-level complex procedural query;
   a query execution unit (QEU) in communication with the query buffer and configured to execute the top-level complex procedural query and the sub-queries; and
   a device in communication with the QEU and with the query buffer, the device configured to indicate to the query buffer when at least one of query execution and sub-query execution results in the soft failure;
   such that the system continually executes independent sub-queries when a given sub-query results in a soft failure; and
   wherein failed sub-queries are referred to the database adaptors when the execution of the top-level query finishes.

5. The system of claim 1 wherein the set of database adaptors configured to optimize and refer the collections of queries to external databases is configured to modify the collections of external database queries at subsequent iterations of the execution of the complex procedural query.

6. The system of claim 1 wherein the set of database adaptors configured to optimize and refer the collections of queries to external databases is further configured to access the query cache to determine if results for at least one of the collections of external database queries is stored in the query cache.

7. The system of claim 1 wherein the database adaptors are configured to provide the results of the external database queries to the query cache, and to provide information indicative of the unresolved data.

8. The system of claim 1 further comprising an external memory, wherein the query cache is configured to be in communication with the external memory.

9. A method for complex procedural query execution, the method comprising:
   a. executing an entire complex procedural query defined using a general-purpose functional programming language, detecting a soft failure, indicative that the execution of the query resulted in incomplete information, and noting any unresolved data which the query needs but does not have;
   b. identifying sub-queries to be executed separately;
   c. referring unresolved data needs to at least one database adaptor;
   d. storing resulting responses in a query cache for a future execution; and
   e. iteratively executing (a), (b), (c), and (d) using the resulting responses until no more soft failures occur,
   wherein the complex procedural query is severable such that at least a first portion of the complex procedural query can proceed even if a second portion of the complex procedural query fails.

10. The method of claim 9 wherein the complex procedural query includes a query procedure and wherein the method further comprises identifying the query procedure by an object and by an argument of the procedure.

11. The method of claim 9 wherein the query language is maximally severable.

12. The method of claim 9 wherein iteratively re-executing (a), (b), (c), and (d) using the resulting responses includes generating database requests corresponding to the complex procedural query based on the resulting responses obtained in at least one earlier iteration of executing the query.

13. A system for processing complex procedural queries, the system comprising:
   a query buffer processor for receiving a complex procedural query, including a plurality of sub-queries, for iterated execution, wherein the complex procedural query is expressed using a general-purpose functional programming language;
   an external memory for storing non-persistent program data and procedures that can be routinely accessed in the course of query execution;
   a query execution unit (QEU) processor in communication with the query buffer processor and the external memory, the QEU processor configured to iteratively execute the entire complex procedural query by executing the sub-queries of the complex procedural query and combining results of the sub-queries such that incomplete execution of one sub-query does not rule out execution of other independent sub-queries;
a device in communication with the QEU processor, the device configured to signal and respond to soft failures, which can terminate one sub-query of the complex procedural query while allowing other independent sub-queries to proceed;
a hardware query cache in communication with the QEU processor, the hardware query cache configured to store known query results for immediate retrieval without recourse to at least one external database, to return known query results, and to return a soft failure, indicative that the execution of the complex procedural query resulted in incomplete information, when results are not known without recourse to at least one external database; and
a plurality of external database adaptor processors in communication with the hardware query cache, the database adaptor processors configured to optimize a set of independent queries bundled together into a single package,
wherein the QEU processor is configured to execute a subsequent iteration of the entire complex procedural query, if a soft failure is returned from a previous iteration of the query, using results of the query obtained in at least one earlier iteration of the query execution until no further soft failures occur,
wherein the complex procedural query is severable such that at least a first portion of the complex procedural query can proceed even if a second portion of the complex procedural query fails.

14. The system of claim 13 wherein the device is configured to signal a requesting application that the query execution is complete when a query execution completes without any software failures.

15. The system of claim 14 wherein the QEU processor is configured to forward the results of the query execution to a requesting application when a query execution completes without any software failures.

16. The system of claim 13 wherein the system further comprises:
a query rewriter processor in communication with the query buffer, the query rewriter processor configured to receive the complex procedural query and to convert certain query language constructs into a form that the QEU processor can execute.

17. The system of claim 13 wherein the plurality of database adaptors are configured to provide the known query results to the hardware query cache, and to provide information indicative of the soft failures.

18. The system of claim 13 wherein the hardware query cache is further configured to be in communication with the external memory.

19. The system of claim 13 wherein the QEU processor is configured to be used with a query language that is repetitively innocuous.

20. The system of claim 13 wherein one or more of the query buffer processor, the external memory, the QEU processor, the device, the hardware query cache, and the plurality of external database adaptor processors are combined in a single hardware unit.

* * * * *